Dec. 15, 1936.  N. C. PRICE  2,064,494
CONTROL SYSTEM
Filed Sept. 12, 1934  2 Sheets-Sheet 2
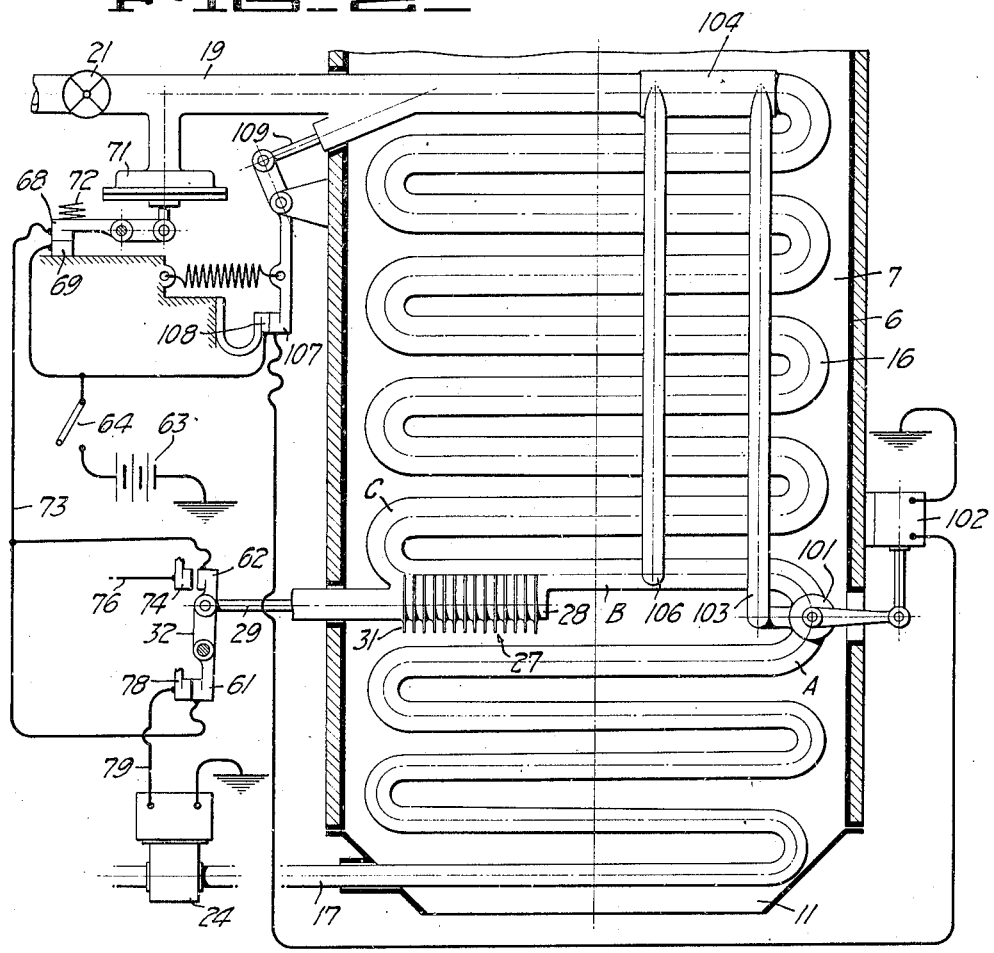
FIG_2_
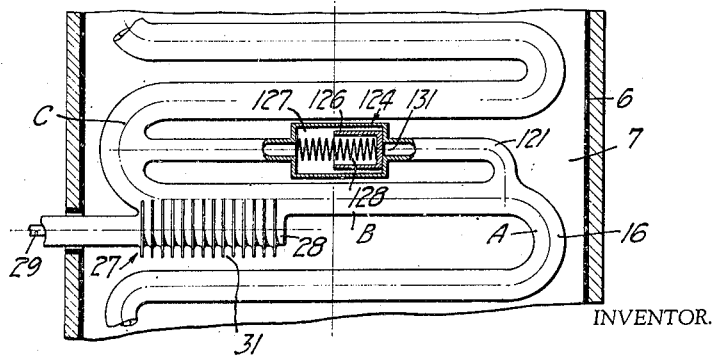
FIG_3_
INVENTOR.
Nathan C. Price Patented Dec. 15, 1936

2,064,494

UNITED STATES PATENT OFFICE 2,064,494

CONTROL SYSTEM

Nathan C. Price, Berkeley, Calif.

Application September 12, 1934, Serial No. 743,701

22 Claims. (Cl. 122—448)

My invention relates to means for controlling a characteristic, such as temperature of the working fluid, for instance steam, issuing from a boiler of the forced circulation type. The present invention is for a control system in the same general field as that referred to in my copending application entitled "Control", filed September 30, 1933, with Serial No. 691,682.

Boilers of the forced circulation type include a tube, the length of which is approximately 10,000 or more times the diameter of the tube, in certain practical cases the tube is about one-half inch in inside diameter and about 600 feet long. The tube is heated by a variable, usually intermittently operating source of heat. The working fluid is introduced as a liquid into one end of the tube, and being gradually heated and changing into vapor as it advances through the tube, issues as a gas from the other end of the tube. The pressure decreases from the inlet of the tube toward the outlet thereof in accordance with the rate of flow through the tube which in turn depends upon the load on the boiler, and upon other factors. When the load fluctuates, the pressure drop through the tube does likewise. Normally, a simple forced circulation boiler, expected to discharge steam at a uniform temperature, for instance 900°, will instead furnish steam fluctuating in temperature between, say 500° and 1,000°.

That is, the pressure and the temperature of the fluid issuing from a simple forced circulation boiler follow each other in an irregular sequence of fluctuation and in no wise even roughly approximate the desired steady values.

For this reason, it has become customary to apply to a forced circulation boiler some sort of control system including a thermostat responsive to a temperature of fluid in the boiler tube, by which the supply of heat is varied and the supply of water is varied. But the forced circulation boiler has even so remained inherently unstable. One of the principal contributing factors to such instability is the lag of the thermostat in responding to suddenly imposed loads, although under steady loads some instability also exists. This deleterious lag cannot be offset by the physical location of the thermostat in the length of the boiler tube. This is clear from an analysis of all of the possible locations from the inlet to the outlet.

If the thermostat controlling the feedwater supply is located in the tube between the boiler inlet and the vapor formation zone, it finds itself in a long column of liquid with a relatively small temperature gradient, and a velocity dependent entirely upon the contemporary output of the feedwater pump. The thermostat at this location does not provide the desired response to a sudden throttle opening due to the long time elapsing before the temperature at this point is brought up to a value sufficient to bring in the proper supply of feedwater. Furthermore, the thermostat is so remote from the boiler outlet that the regulation must be poor due to the customary temperature vagaries between the two points.

If the thermostat is located in the evaporation zone, it rests in a body of fluid with a relatively slight temperature gradient. When the throttle is suddenly opened full, the pressure of the entire evaporation zone falls, and steam is formed explosively at this region, with a corresponding temperature drop. But there should be a temperature increase in order thermostatically to increase the flow from the feedwater pump. Instead, an increase is actually precluded rather than established and a disruption of the control of the boiler results.

If the thermostat is placed in the superheat zone of the boiler, then as in the last case, the adiabatic expansion attendant upon the relatively large pressure drop throughout this zone causes a temporary drop in temperature, thus precluding increase of the flow of feedwater and shortly resulting in serious recession of the evaporation zone. The temperature gradient of the superheat zone is generally four or five times as great as that of the liquid portion of the boiler due to high rates of heat transfer. When the temperature of the thermostat reaches the value necessary to bring on the greater rate of feedwater supply, the temperature is increasing very rapidly, and due to the tardiness of increase of feedwater supply, the temperature overshoots the value of the maximum setting and the fire is shut off and held off during the entire period of excess temperature. The pressure during this period drops to an exceedingly low value. Since the water pump still operates, the initial portions of the boiler now become filled with an excess of cool water ineffective upon the thermostat because the final part of the boiler where the thermostat is located is still hot. The boiler temperature gradient has become badly distorted. Subsequently, the excessive supply of cool liquid reaches the normal superheating zone, and a surge of high pressure and low temperature results, with the boiler discharging saturated steam.

It is therefore an object of my invention to provide an improved control system for the forced circulation type boiler.

Another object of my invention is to provide a forced circulation type boiler which is inherently stable.

Another object of my invention is to provide a control system which is mechanically and theoretically very simple.

A further object of my invention is to provide a control system which is adequate and effective at all points within the wide range of variable loading to which a forced circulation boiler is normally subject.

Another object of my invention is to provide stable equilibrium of heat flow in the boiler for any operating condition.

A further object of my invention is to so control the flow of feedwater that the temperature gradients of the boiler fluid, from the inlet to the outlet, are approximately the same for all conditions of loading which may be imposed upon the boiler, thereby eliminating devices which cause abrupt temperature changes in any part of the boiler fluid.

The foregoing and other objects of the invention have been attained in the embodiment of the invention illustrated in the drawings, in which:

Figure 2 is a schematic diagram of a modified form of my invention.

Figure 3 is a schematic diagram of a further modified form of my invention.

Figure 1:
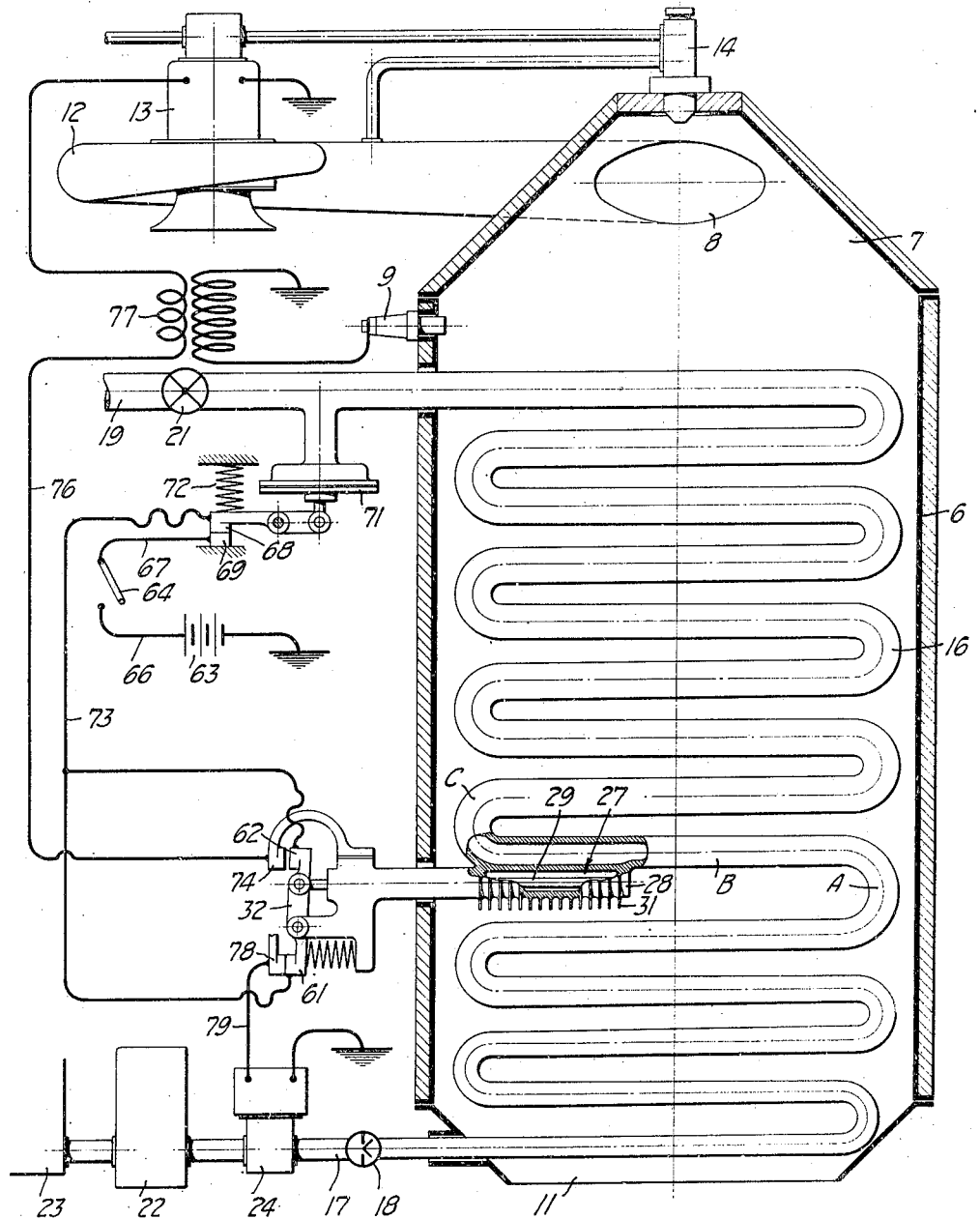
Figure 1 is a schematic diagram of a forced circulation boiler provided with a control system in accordance with my invention.

Although the control system of my invention is applicable to different environments, I have illustrated it herein as it is applied to a forced circulation boiler of a well known type, which includes a boiler casing 6 enclosing a chamber 7 supplied with a combustible mixture issuing from an inlet 8 and ignited by a spark plug 9. The products of combustion leave the chamber 7 through an outlet 11. The mixture is furnished by an air blower 12 driven by an electric motor 13 and incorporating suitable fuel from a carburetor 14. By suitably controlling the electric motor 13, the supply of heat to the chamber 7 can be controlled. Within the chamber 7 is located a long convoluted tube 16. The tube is provided with an inlet 17 adjacent one end, at which there is situated a check valve 18, and is provided with an outlet 19 adjacent the other end, at which is situated a suitable throttling valve 21. A suitable working fluid, such as water, is drawn by a pump 22 from a tank 23, and is discharged through the check valve 18 into the tube 16. Preferably, the pump 22 is driven or controlled by a suitable electric mechanism 24, so that the supply of water or other working fluid can be controlled as desired.

As the water, which is relatively cold when it enters the inlet 17, advances along the interior of the tube 16, it absorbs heat through the walls of the tube from the much hotter surrounding gases of combustion. As it advances and absorbs heat, it arrives at a region A where it begins to change state by ebullition from the liquid phase into the vapor and gaseous phase. In a forced circulation type boiler, due to many factors such as the tremendously high velocity of flow through the tube, the ebullition takes place throughout many feet of the tube 16, and the separation between vapor and liquid is partially effected by centrifugal action as the mixed fluids round curves in the tubing at high velocity. There is, however, along the length of the tube 16 a zone B beginning at the region A and terminating at the region C wherein virtually all of the actual ebullition takes place. This portion of the tube can be referred to properly as the evaporation zone. This zone B tends to vary in extent and to travel along the length of the tube in accordance with various factors, such as variation in load. From the end C of the ebullition zone, the fluid continues to extract heat from the products of combustion as it advances through the remainder of the tube to the outlet 19, thereby becoming considerably superheated.

I have discovered that if the zone of ebullition B, which inherently travels throughout a large region in the boiler and fluctuates somewhat in accordance with the load, is not permitted to travel but is maintained within a reasonably close range of fluctuation within the boiler tube, and as nearly as possible is established at a predetermined region or point, the forced circulation type boiler becomes stable rather than inherently unstable, and that with only a rudimentary control, the temperature of the issuing steam will hold within extraordinarily close limits under all conditions.

In accordance with my invention therefore, I provide means for maintaining the zone of ebullition substantially at a desired location. This I prefer to accomplish by extracting at two different rates, heat from a definite region which is within the chamber 7 and which surrounds the desired location of the ebullition zone within the tube. The lower rate is utilized alternately with the higher rate in order that an average rate of extraction can be maintained at a given location in the tube. By having the two rates of heat extraction, wide variations in the supply of heat will not in any wise come outside of the province of the control system.

In order to provide the minimum rate of heat extraction and the maximum rate of heat extraction, I preferably utilize the different heat extracting or absorbing capabilities of a fluid in different states. That is, all other conditions being equivalent, a fluid when in the liquid state is much more heat absorbtive than the same fluid when in the vapor state. For instance, under equivalent conditions, water will absorb many times the amount of heat than will steam.

In order that the difference between the rate at which heat is supplied to the region B, and the rate at which heat is extracted therefrom can be controlled and the ebullition zone can, consequently, be confined, I preferably provide at the selected ebullition zone B, a device 27 sensitive or responsive to the difference between the rate of heat supply and the rate of heat extraction. This device is conveniently termed a "vaporimeter" and in the present embodiment takes the form of an outer metal tube 28 and an inner quartz rod 29. Metal fins 31 are an integral part of the tube 28 and provide strong thermal contact with the gases of combustion. Fluctuations in temperaure cause a relative mechanical movement between the members 28 and 29 for convenience imparted to a lever 32. The member 27 is mounted in thermal conducting relationship with the tube 16 at the zone B, is exposed to the gases of combustion in order to be sensitive to the rate of heat supplied, and in addition, the vaporimeter 27 is thermally exposed to the contents of the tube in order to be sensitive to the rate of heat extraction.

For instance, if it be assumed that the element 27 were so insulated that no heat could be extracted therefrom, then the heat supplied by the products of combustion would very quickly bring the element 27 up to the average temperature of the products of combustion. On the other hand, if it be assumed that no heat were supplied to the member 27 exteriorly, then due to the thermal contact with the tube 16 and the contents thereof, the temperature of the element 27 very quickly would assume the mean temperature of the tube 16 and its contents. The vaporimeter is not at the same temperature as the boiler tube fluid. If it were, it would not be sensitive to the flow and temperature of the gases of combustion, to the physical state (liquid or gaseous) of the boiler fluids, and to the rate of flow of the boiler fluid. Since the vaporimeter 27 in fact differentiates between the rate at which heat is supplied and the rate at which heat is extracted, this effect is made use of and is enhanced to be of sufficient magnitude for practical use by placing the device 27 adjacent the desired general location of the ebullition zone B.

Thus, when water having a very high heat absorbing capability is in contact thermally with the device 27, the vaporimeter more closely approaches the relatively low temperature of the water rather than the relatively high temperature of the products of combustion. In this case, the temperature of the vaporimeter 27 tends to be relatively low. On the other hand, if steam is in contact with the vaporimeter 27, and heat is being supplied by the products of combustion, then, such steam having a relatively poor heat absorbing ability, the temperature of the vaporimeter 27 tends to rise to approach the temperature of the hotter products of combustion. Thus, the temperature of the vaporimeter 27 tends to be relatively high. In this wise, the lever 32 is moved in accordance with the movement of the zone of ebullition B toward and away from its desired location within the tube 16.

Movement of the lever 32 is utilized to control the supply of heat and the supply of feed fluid. To this end, the lever 32 is provided with electrical contacts 61 and 62 included in an electrical circuit. The circuit includes a grounded battery 63, connected to a manually operated master switch 64, by a lead 66. When the master switch is closed, current may travel along a lead 67 to a pair of pressure diaphragm contacts 68 and 69. If the boiler pressure is below a selected value the pressure diaphragm 71 allows contact 68 to touch contact 69 under the influence of a spring 72 and the current may then proceed along a lead 73 to the vaporimeter water contact 61 and to the vaporimeter fire contact 62. Below a predetermined temperature the fire contact 62 is in junction with a cooperating fire contact 74 permitting the current to progress along a lead 76 to an ignition coil 77 and to energize the electric blower motor 13 thereby supplying heat to the chamber 7.

Above a predetermined temperature, which preferably is lower than that required to break the fire contacts 62 and 74 apart, the water contact 61 meets a cooperating water contact 78 and the current passes along a lead 79 to the structure 24 controlling the feedwater pump, thereby supplying water at the maximum rate. Thus, despite fluctuations in the heat supply, when the rate of extraction of heat from the vaporimeter 27 is great, due to the presence of water in thermal contact therewith, the lever 32 is moved to open the electrical circuit to the device 24 which therefore precludes addition of water. On the other hand, when vapor or steam is in contact with the vaporimeter 27, the rate of heat extraction is so much less than the rate of heat supplied despite fluctuations of such rate, that the lever 32 is moved to close the circuit to the controlling device 24 so that the pump 22 is effective to introduce additional water into the tube 16. Introduction of water continues until the water advances along the tube into thermal communication with the vaporimeter 27, at which time the cycle is completed.

In accordance with the arrangements described, a tendency exists for the region of vapor formation suddenly to move a considerable distance from the vaporimeter 27 when there is a great variation of load. Thus, when the throttle is opened wide in an instant, a pressure wave moves toward the inlet end of the boiler tube at acoustic velocity, the saturated liquid adjacent the vaporimeter bursts into vapor, and the region of vapor formation recedes to a point in the tube where the fluid has a temperature corresponding to the new pressure. The vaporimeter is thus left in contact with fluid (steam) of low conductivity, nevertheless, fluid of approximately the same temperature as before. But the vaporimeter instead of remaining static rises rapidly in temperature due to the heat of the combustion gases now having a proportionately much greater effect upon the vaporimeter temperature. The consequence of this is a prompt demand by the vaporimeter for a large flow of feedwater, which in the actual case is ultimately needed.

Under certain conditions of operation, I desire that additional factors be effective upon the operation of the vaporimeter 27, and for that reason I have illustrated in Figure 2 a somewhat modified form of my invention. In this arrangement the major parts are substantially as heretofore described. However, in accordance with this modification, I preferably provide means adjacent the region A for by-passing some or all of the fluid within the tube 16 to a different region of the boiler. To this end, adjacent the region A, I locate a suitable type of valve 101 which is controlled electrically by a solenoid 102. The valve communicates with a tube 103 leading to a jacket 104 surrounding the tube 16 in thermal exchanging relationship therewith and in advance of the throttle 21. The jacket is comparable to that disclosed in my co-pending application, identified hereinabove. An outlet from the jacket 104 is provided by the tube 106 extending back to the main tube 16 in advance of the vaporimeter 27 as shown in Fig. 2. The solenoid 102 is energized in accordance with the operation of a pair of contacts 107 and 108, respectively, which are included in an electric circuit from the battery 63. The contacts are actuated relatively to each other by a thermostat 109 which is thermally located in the tube 16 between the throttle 21 and the jacket 104.

In the operation of this modification, when for any of various reasons the temperature of the thermostat 109 rises to a predetermined value, the contacts 107 and 108 are closed to complete the circuit through the solenoid 102. The solenoid, being energized, opens the valve 101 and permits some or all of the contents of the tube 16 to travel through the jacket 104. The jacket contents, being somewhat cooler than the contents of the tube 16 within the jacket, absorb the heat therefrom, thus not only lowering the temperature of the tube contents but likewise raising the temperature of the jacket contents. The somewhat heated jacket fluid then returns to a point in advance of the vaporimeter 27 as shown in Fig. 2.

In the meantime, if the vaporimeter has been deprived of by-passed fluid, it is more subject to the temperature of the products of combustion and under any circumstances the tube fluid flowing to it is hotter and its temperature rises, thereby bringing on or augmenting the feedwater supply. In this wise, a large proportion of feedwater is supplied to correct the discrepancy which originally caused the excessive temperature at the thermostat 109. The augmented supply of feedwater restores the equilibrium of the system so that subsequently the thermostat 109 opens the contacts 107 and 108 and restores the valve 101 to closed position, thus completing the cycle.

Also for certain conditions of operation, I provide the modification shown in Figure 3 which affords a variation in the response obtained from the vaporimeter 27. In this instance, from the region A of the tube 16, I preferably lead off a shunting tube 121 which by-passes the vaporimeter 27 and re-enters the boiler tube 16. As the load on the boiler increases the resistance to flow and the pressure drop within the tube 16 increase, I preferably take advantage of this effect to cause a variation in the response of the vaporimeter in accordance with the load on the boiler tube 16. To this end the shunting tube 121 is controlled by a pressure responsive valve 124 which takes the form of a piston 126 operating in a chamber 127 communicating with the shunting tube 121 and ordinarily urged by a coil spring 128 to seat upon an orifice 131 in the tube 121. When flow through the tube 16 is relatively small, there is not sufficient pressure drop to open the passage through the shunting tube 121, and the vaporimeter operates without modification. On the other hand, when the load on the boiler increases to a predetermined amount, the pressure drop likewise increases so that the urgency of the spring 128 is overcome, the valve 124 is opened, and at least some of the fluid flowing through the tube 16 by-passes the vaporimeter completely. The result of this is to reduce the effect of the interior boiler fluid upon the vaporimeter and to augment the effect of the products of combustion. This increases the net or mean temperature of the vaporimeter, thus bringing on or augmenting the feedwater supply to compensate for the increased load. When the load decreases, the pressure drop likewise decreases, the parts return to their illustrated positions, and the vaporimeter operates again without modification.

I claim:

1. A boiler control comprising a long tube having an inlet adjacent one end thereof and an outlet adjacent the other end thereof, means for heating said tube, means for supplying feed fluid to said inlet, and a thermostatic means for distinction between presence of liquid and presence of vapor, said thermostatic means in direct thermal contact with and responsive to thermal conductivity of the boiler fluid in the evaporation zone of said tube and exposed to thermal conditions exteriorly of said tube for controlling said supplying means in accordance with said distinction.

2. A boiler control comprising a long tube having an inlet adjacent one end and an outlet adjacent the other end thereof, means for heating said tube exteriorly, means for supplying feed fluid to said inlet to advance through said tube to said outlet, thermally responsive means for distinction between presence of liquid and presence of vapor directly affected by thermal conditions interiorly of the evaporation section of said tube and exteriorly thereof for controlling said supplying means in accordance with said distinction.

3. A boiler control comprising a long heated tube, means for advancing feed liquid through said tube to become progressively heated and to evaporate in a predetermined portion of said tube, and thermal steam quality responsive means in direct thermal contact with said portion for controlling said advancing means in accordance with said quality.

4. A boiler control comprising a long heated tube, means for advancing feed liquid in said tube to evaporate in a predetermined portion of said tube, and means directly responsive to the difference between the rate of heat supplied to said portion and the rate of heat extracted from said portion as varied by the liquid to vapor ratio in said portion for controlling said advancing means in accordance with said ratio.

5. A boiler control system comprising a long tube, means for heating said tube with products of combustion, means for cooling said tube with feed liquid, and heat contributing means responsive to the thermal effects of said products of combustion and in direct thermal contact with said feed liquid within the evaporation portion of said tube for controlling said cooling means.

6. A boiler control comprising a long tube having an inlet adjacent one end and an outlet adjacent the other end thereof, means for introducing liquid into said inlet, means for producing ebullition of said liquid in a predetermined region in said tube, and thermally responsive means for distinguishing between presence of liquid and presence of vapor, only, in said region for controlling said introducing means.

7. A boiler control comprising a forced circulation boiler tube, means for heating said tube, means for introducing liquid into said tube to flow therethrough, and thermally responsive means located in the ebullition region of said tube for controlling said introducing means to introduce a greater amount of liquid until said liquid arrives at said region and a lesser amount of liquid when said liquid has arrived at said region regardless of the temperature of the fluid in said region.

8. A boiler control comprising a forced circulation boiler tube, means for heating said tube, means for forcing liquid to flow through said tube so that ebullition occurs at a heated region of said tube, and thermally responsive means in direct thermal relationship with said region for controlling said forcing means.

9. A boiler control comprising a long tube having an inlet adjacent one end, an outlet adjacent the other end, and an evaporation region between said ends, means for heating said tube, means for introducing liquid into said inlet, and thermally responsive means in direct thermal contact with the evaporating liquid at said region for controlling said introducing means in relation to the proportional amount of vapor of said liquid formed in said region.

10. A boiler control comprising a long tube having an inlet adjacent one end, an outlet adjacent the other end, and an evaporation region between said ends, means for exteriorly heating said tube with products of combustion, means for introducing liquid into said inlet, and a physical state responsive means subject to thermal conditions in said evaporation region and subject to said products of combustion for controlling said introducing means.

11. A boiler control comprising a long tube having an inlet adjacent one end, an outlet adjacent the other end, and an evaporation region between said ends, means for exteriorly heating said tube with products of combustion, means for introducing liquid into said inlet, and thermally responsive means subject to physical state of the boiler fluid in said evaporation region and subject to said products of combustion for controlling said introducing means and said heating means in accordance with said physical state.

12. A boiler control comprising a forced circulation boiler tube, means for sweeping said tube with hot gases for heating said tube, means for forcing liquid to flow through said heated tube so that ebullition occurs at a gas swept region of said tube, and means directly responsive to thermal conditions in the tube at said region for controlling said forcing means and said heating means.

13. A boiler control comprising a long tube having an inlet adjacent one end, an outlet adjacent the other end, and an evaporation region between said ends, means for heating said tube, means for introducing feed liquid into said inlet, thermally responsive means in direct thermal contact with the tube at said evaporation region for controlling said heating means, a by-pass in said tube shunting said responsive means, and means for controlling flow through said by-pass.

14. A boiler control comprising a long tube having an inlet adjacent one end, an outlet adjacent the other end, and an evaporation region between said ends, means for heating said tube, means for introducing feed liquid into said inlet, thermally responsive means in direct thermal contact with the tube at said evaporation region for controlling said heating means, and means for varying the effect of said responsive means in accordance with the load upon said tube.

15. A boiler control comprising a long tube having an inlet adjacent one end, an outlet adjacent the other end, and an evaporation region between said ends, means for heating said tube, means for introducing feed liquid into said inlet, thermally responsive means in direct thermal contact with the tube at said evaporation region for controlling said heating means, and thermostatically responsive means in said tube adjacent said outlet for varying the effect of said responsive means.

16. A boiler control comprising a long heated tube having an inlet and an outlet, an evaporation zone intermediate of said inlet and said outlet, means for supplying feed liquid to said inlet, and a thermostatic physical state responsive means in thermal contact with the evaporating liquid in said tube and in thermal contact with a separate substance at a different temperature from that of said evaporating liquid for controlling said supplying means in accordance with said state.

17. A control comprising a conduit having an inlet adjacent one end thereof for the admission of feed fluid of a first physical state, an outlet adjacent the other end thereof for emission of said fluid in a second physical state, a critical region of change of state of said fluid intermediate of said ends, means for supplying said feed fluid to said inlet, thermostatic physical state responsive means in thermal contact with said region and in thermal contact with a separate body of different temperature from that of said region for regulating said supplying means in accordance with said physical state regardless of temperature in said region.

18. A boiler control comprising a boiler tube having an inlet and outlet at opposite ends and an evaporation zone intermediate of said ends, means for supplying feed liquid to said inlet, means for controlling the discharge of superheated vapor from said outlet, and means directly sensitive to the rate of heat transfer as effected by change of state in said evaporation zone for controlling said supplying means.

19. A boiler control comprising a long tube, means for heating said tube, means for filling said tube with liquid up to a predetermined zone in the length of said tube, a thermal reservoir at a temperature independent from that of said zone, and thermally responsive means in thermal contact with said zone and said reservoir which said responsive means at any given temperature in said zone, will control said filling means in accordance with the proportional amount of liquid in said zone.

20. A boiler control comprising a long heated tube having an inlet adjacent one end, and an outlet adjacent the other end thereof, means for introducing liquid into said inlet, means for producing ebullition of said liquid in a predetermined region in said tube, thermally responsive means in said region for controlling said introducing means, and means for independently delivering heat regardless of the temperature of the boiler fluid at the evaporation zone to said thermally responsive means.

21. A series tube boiler control comprising a long heated tube for generation of the superheated vapor of the liquid medium fed to its inlet end, an evaporation region in an intermediate portion of said tube, and a means located at a point in said region thermally responsive to the proportional amount of said fed liquid entrained in the boiler evaporation zone at said point for controllng said liquid feeding rate.

22. A boiler control comprising a long tube externally heated by gases of combustion from the inlet adjacent one end of said tube to the outlet adjacent the other end of said tube, means for introducing liquid into said inlet, a region of ebullition in said tube between said ends, a thermostatic means responsve to the temperature of the tube in said region for controlling said liquid introducing means, and means for abruptly increasing the heat absorbing external tube surface in said region.

NATHAN C. PRICE.